United States Patent [19]

Tanaka et al.

[11] Patent Number: 5,665,480
[45] Date of Patent: Sep. 9, 1997

[54] COPPER-LEAD ALLOY BEARING

[75] Inventors: Tadashi Tanaka; Masaaki Sakamoto; Koichi Yamamoto; Tsukimitsu Higuchi, all of Nagoya, Japan

[73] Assignee: Daido Metal Company Ltd., Nagoya, Japan

[21] Appl. No.: 614,098

[22] Filed: Mar. 12, 1996

Related U.S. Application Data

[63] Continuation of Ser. No. 340,325, Nov. 14, 1994, abandoned.

[30] Foreign Application Priority Data

Dec. 22, 1993 [JP] Japan .................. 5-346663

[51] Int. Cl.$^6$ ............ F16C 33/12; B32B 15/20; C22C 9/08
[52] U.S. Cl. .......... 428/645; 428/553; 428/674; 428/677; 384/912; 420/472; 420/473; 420/474; 420/499
[58] Field of Search ............ 428/677, 674, 428/675, 676, 644, 553; 384/912; 420/472, 473, 474, 485, 491, 499

[56] References Cited

U.S. PATENT DOCUMENTS

| | | | |
|---|---|---|---|
| 2,558,523 | 6/1951 | Luther | 420/474 |
| 4,406,857 | 9/1983 | Mahrus et al. | 420/474 |
| 4,505,987 | 3/1985 | Yamada et al. | 420/473 |
| 4,937,149 | 6/1990 | Mori | 428/674 |
| 4,999,257 | 3/1991 | Imai | 428/677 |
| 5,256,494 | 10/1993 | Tanaka et al. | 428/677 |
| 5,334,460 | 8/1994 | Tanaka et al. | 428/677 |
| 5,346,668 | 9/1994 | Tanaka et al. | 420/473 |

FOREIGN PATENT DOCUMENTS

| | | | |
|---|---|---|---|
| 569108 | 1/1959 | Canada | 420/485 |
| 56-9346 | 1/1981 | Japan | 420/473 |
| 57-185994 | 11/1982 | Japan . | |
| 648379 | 1/1951 | United Kingdom | 420/473 |
| 2175603 | 12/1986 | United Kingdom . | |

*Primary Examiner*—John Zimmerman
*Attorney, Agent, or Firm*—Browdy and Neimark

[57] ABSTRACT

A copper-lead alloy bearing having a high corrosion resistance, especially a high corrosion resistance to sulfur, comprising a back metal and a copper-lead-based bearing alloy bonded thereto. The copper-lead-based bearing alloy consists of more than 10 but not more than 20% Ni, 0.5 to 8% Sn, 8 to 30% Pb, not less an 0.005 but not more than 0.2% P, and the balance of Cu and incidental impurities.

9 Claims, No Drawings

COPPER-LEAD ALLOY BEARING

This application is a continuation of parent application Ser. No. 08/340,325, filed Nov. 14, 1994 now abandoned.

BACKGROUND OF THE INVENTION

The present invention relates to a copper-lead alloy bearing and, in particular, to a copper-lead alloy bearing having an excellent corrosion resistance.

A copper-lead alloy bearing with improved corrosion resistance has been disclosed in JP-A-57-185944. This alloy is formed as a bimetal in which an alloy powder consisting of 2 to 10 wt % Ni, 8 to 27 wt % Pb, 0.5 to 10 wt % Sn, and the balance of Cu is sintered on a back metal consisting of steel. When this alloy powder is sintered on the back metal, Pb phase is prevented from being agglomerated so that the Pb phase may be fine in size and so that discrete and uniform distribution of the Pb phase may be obtained, with the results that the acid corrosion of Pb in a lubricant is said to be prevented and that the corrosion resistance of the bearing is said to be improved.

In recent years, however, it is tried to further reduce friction by use of such an engine oil as having additives of a large amount of sulfur. This makes it necessary for bearings to have an excellent corrosion resistance even in a case where a lubricant containing a large amount of sulfur is used. That is, in a lubricant with a high sulfur content, since Cu phase which is the matrix of the alloy is preferentially corroded by sulfur, conventional copper-lead alloy bearings are often insufficient in terms of corrosion resistance. In addition, some copper-lead alloy bearings, which have improved corrosion resistance to lubricants with a high sulfur content, are inferior in corrosion resistance to degraded lubricants.

SUMMARY OF THE INVENTION

It is the object of this invention to provide a copper-lead alloy bearing which has both an improved corrosion resistance, especially to sulfur, even under conditions where lubricants with a high sulfur content are used, and an excellent corrosion resistance to degraded corrosive lubricants with a low sulfur content.

According to the first aspect of the present invention, a multilayer bearing comprises a back metal and a copper-lead alloy layer bonded thereto consisting by weight of more than 10% but not more than 20% Ni, 0.5 to 8% Sn, 8 to 30% Pb, not less than 0.005 but not more than 0.2% P, and the balance Cu and incidental impurities.

According to the second aspect of the present invention, a multilayer bearing having a three-layer structure comprises a back metal, a copper-lead bearing alloy layer bonded thereto and an overlay, said alloy consisting by weight of more than 10% but not more than 20% Ni, 0.5 to 8% Sn, 8 to 30% Pb, not more than 0.2% P, and the balance Cu and incidental impurities.

The function of each composition of the bearing alloy layer and the overlay according to the present invention will be explained below.

(1) Copper-Lead Bearing Alloy Layer

1. Ni: More than 10 but not more than 20% by weight

The Ni content is in the range of more than 10 but not more than 20% because, if the Ni content is 10% or less, the corrosion resistance to sulfur will be insufficient, and, if the Ni content is more than 20%, the conformability of the bearing which conformability is necessary for the shaft, which is a sliding counterpart, will be degraded. Preferably, the Ni content is 10.5 to 18% and, the most preferably, the Ni content is 10.5 to 15%.

2. Sn: 0.5 to 8% by Weight

The Sn content is 0.5 to 8% by weight because, if the Sn content is less than 0.5%, the mechanical strength of the alloy layer will be insufficient, and, if the Sn content is more than 8%, the alloy will become excessively hard and brittle, and thermal conductivity was decreased, resulting in degraded anti-seizure property. The preferable range of the Sn content is 0.5 to 5% by weight.

3. Pb: 8 to 30% by Weight

The Pb content is 8 to 30% by weight because, if the Pb content is less than 8%, the anti-seizure property will become degraded, and, if the Pb content exceeds 30%, the mechanical strength will be decreased. The preferable range of the Pb content is 10 to 26% by weight.

4. P: Not less than 0.005 but not more than 0.2% by weight

The P content is not less than 0.005, but not more than 0.2% by weight, because, if the P content exceeds 0.2%, the alloy will become excessively hard and the conformability for the shaft will become degraded, and, if the P content is less than 0.005%, the mechanical strength of the alloy will become insufficient. The preferable range of the P content is 0.01 to 0.10% by weight.

The bimetal may be produced by either one of the following methods: a sintering method, in which an alloy powder or a mixed metal powder as the copper-lead powder is spread on a steel plate, and then it is sintered and rolled; or a continuous strip casting method, in which a molten bearing alloy is cast on a preheated steel strip as a lining and then it is cooled; or a centrifugal casting method, in which a molten bearing alloy is cast onto the internal wall of a preheated steel pipe as a lining by centrifugal force and then it is quenched.

(2) Overlay

In the overlay, at least one of the following Sn, in and Cu is contained in the balance Pb and incidental impurities.

1. Sn: 3 to 18% by Weight

The Sn content is 3 to 18% by weight because, if the Sn content is less than 3%, the mechanical strength of the overlay will become insufficient and corrosion resistance will become degraded, and, if the Sn content exceeds 18%, the melting point of the overlay will be lowered, resulting in a wiping phenomenon (melting and flowing).

2. In: 15% by Weight or Less

The In content is 15% by weight or less because, if the In content exceeds 15%, the melting point of the overlay will be lowered, resulting in the wiping phenomenon.

3. Cu: 5% by Weight or Less

The Cu content is 5% by weight or less because, if the Cu content exceeds 5%, the overlay will become excessively hard and brittle.

The multilayer bearing according to the present invention comprises a back metal and a copper-lead-based bearing alloy later bonded thereto, and the copper-lead-based bearing alloy consists of more than 10 but not more than 20% Ni, 0.5 to 8% Sn, 8 to 30% Pb, not less than 0.005 but not more than 0.2% P, and the balance of Cu and incidental impurities, with the result that the copper-lead alloy bearing has a high corrosion resistance, especially to sulfur, without any deterioration of its fatigue resistance.

DESCRIPTION OF THE PREFERRED EMBODIMENTS

The embodiments of the present invention using the sintering method will be described in detail together with comparative examples.

Copper-lead-based alloy powders (average particle size: 250 microns or less) of each composition of the embodiments shown in Table 1 (Embodiments 1–7) were spread to have a thickness of 0.7 mm on steel back metals each having a thickness of 1.3 mm plated with copper having a thickness of 8 μm. Each of the powders on the back metals was inserted into the furnace with a reducing atmosphere and was sintered at 700–900° C. for 10–30 minutes. After this sintering, in order to increase the density of the alloy layer and to obtain the desired mechanical strength, both the sintered layer and the back metals were rolled, sintered, and rolled again to form bimetal samples. The bimetal samples of comparative samples (NOS. 8–12) were also prepared in the same manner as the above method. The total thickness of the bimetal samples thus formed was 1.60 mm, and the thickness of the copper-lead bearing alloy layer was 0.35 mm. The hardness and tensile strength of the bearing alloy layers on each bimetal are shown in Table 1.

TABLE 1

| Division | No. | Chemical component (Wt %) | | | | | Hardness Hv5 | Tensile strength N/mm$^2$ |
|---|---|---|---|---|---|---|---|---|
| | | Cu | Sn | Pb | Ni | P | | |
| Embodiment | 1 | Remaining | 0.5 | 10 | 10.5 | 0.07 | 95 | 225 |
| | 2 | Remaining | 0.5 | 25 | 12 | 0.02 | 67 | 160 |
| | 3 | Remaining | 2.0 | 15 | 18 | 0.10 | 98 | 215 |
| | 4 | Remaining | 2.0 | 22 | 15 | 0.05 | 80 | 200 |
| | 5 | Remaining | 2.0 | 22 | 12 | 0.03 | 85 | 210 |
| | 6 | Remaining | 3.0 | 20 | 12 | 0.03 | 100 | 225 |
| | 7 | Remaining | 8.0 | 12 | 11 | 0.05 | 115 | 240 |
| Comparative example | 8 | Remaining | 0.5 | 25 | — | 0.05 | 62 | 155 |
| | 9 | Remaining | 2.0 | 22 | — | 0.05 | 75 | 210 |
| | 10 | Remaining | 2.0 | 22 | 9 | 0.02 | 82 | 215 |
| | 11 | Remaining | 4.0 | 23 | — | 0.05 | 85 | 220 |
| | 12 | Remaining | 4.0 | 20 | 1 | 0.10 | 88 | 225 |

Next, these bimetal samples were cut into pieces having a width of 25 mm and a length of 50 mm, the alloy layer surfaces were polished, and copper plating on the back of the pieces was removed to thereby form test samples for the corrosion test.

The corrosion test was conducted using these test samples. The corrosion test was conducted in two types of lubricants, a lubricant with a low sulfur content and a lubricant with a high sulfur content. The lubricant with a high sulfur content was used for testing Embodiments 3 and 6, and Comparative Examples 8 and 9. In the case of the lubricant with a low sulfur content, a lubricant having been used in a taxi as far as 10,000 km was used, and the sulfur content of this lubricant was 0.38%. This lubricant with a low sulfur content was degraded (oxidized), so that it is apt to promote the acid corrosion of the alloy. For the lubricant with a high sulfur content, a lubricant having a sulfur content of 3.29% was selected.

Each test sample was immersed in the lubricant with the low sulfur content or the lubricant with the high sulfur content to check the amount of corrosion after immersion in the lubricant for 1000 hours at 130° C. The amount of corrosion was the value obtained by dividing the difference in the weight of the test samples before and after the test by the surface area. The results are shown in Table 2.

TABLE 2

| Division | No. | Lubricant (% S) | |
|---|---|---|---|
| | | 0.38 Corrosion (mg/cm$^2$) | 3.29 Corrosion (mg/cm$^2$) |
| Embodiment | 1 | 4 | — |
| | 2 | 9 | — |
| | 3 | 5 | 6 |
| | 4 | 7 | — |
| | 5 | 5 | — |
| | 6 | 6 | 8 |
| | 7 | 5 | — |
| Comparative example | 8 | 20 | 59 |
| | 9 | 10 | 29 |
| | 10 | 13 | — |
| | 11 | 14 | — |
| | 12 | 13 | — |

The test results listed in Table 2 revealed that all of the embodiments had better corrosion resistance than that of the comparative examples with respect to the deteriorated lubricant with the low sulfur content, which showed the effect of the addition of Ni of more than 10% but not more than 20% by weight.

The test results in the lubricant with the high sulfur content showed that the amounts of corrosion in Embodiments 3 and 6 were small at 6 and 8 mg/cm$^2$, while the amounts of corrosion in Comparative Examples 8 and 9 were very large at 59 and 29 mg/cm$^2$, indicating the favorable effect of the present invention.

From each test sample in Embodiments 4 and 5, and Comparative Examples 9 and 10, semicircular bearing-shaped pieces were fabricated by pressing and machining. Onto the pieces were then applied overlays having a composition of 9 wt % In, 9 wt % Sn, 1 wt % Cu, and the balance of Pb which overlay had a thickness of 20 microns formed by electroplating, and they were used as test bearings for the fatigue test. The test conditions of the fatigue test are shown in Table 3, and the test results are shown in Table 4.

TABLE 3

| Item | Condition | Unit |
|---|---|---|
| Testing shaft diameter | 53 | mm |
| Bearing width | 17 | mm |
| Shaft rotation | 3250 | rpm |
| Peripheral speed | 9.1 | m/s |
| Lubricant | SAE20 | — |
| Inlet oil temperature | 100 | °C. |
| Shaft material | S55C | — |

TABLE 4

| Division | No. | Maximum surface pressure without fatigue (MPa) |
|---|---|---|
| Embodiment | 4 | 1500 |
| | 5 | 1500 |
| Comparative example | 9 | 1400 |
| | 10 | 1450 |

The test results showed that the fatigue strengths of Embodiments 4 and 5 are slightly higher than the fatigue strength of Comparative Examples 9 and 10, and that the test bearing of the present invention does not affect the fatigue strength of the bearings.

The above test results showed that the copper-lead bearing alloys of Embodiments 1–7, to which Ni is added, have an excellent result regarding the corrosion resistance to both lubricants with a high sulfur content and corrosive degraded lubricants with a low sulfur content, without deteriorating fatigue strength compared with conventional copper-lead bearing alloys.

What is claimed is:

1. A corrosion-resistant copper-lead alloy multilayer bearing comprising a back metal and a copper-lead-based bearing alloy layer bonded thereto, said copper-lead-based bearing alloy layer consisting by weight of 10.5 to 18% Ni, 0.5 to 8% Sn, 10 to 26% Pb, 0.005 to 0.1% P, and the balance Cu and incidental impurities said bearing having high corrosion resistance to both lubricant with a high sulfur content and corrosive degraded lubricant.

2. A copper-lead alloy bearing as set forth in claim 1, in which said back metal is a steel, or a steel having a plating layer of copper or a copper alloy layer of a thickness of 10 µm or less on the side of said copper-lead-based bearing alloy layer.

3. A copper-lead alloy bearing as set forth in claim 1, wherein the Ni content of said copper-lead-based alloy layer is 10.5 to 15%.

4. A copper-lead alloy bearing as set forth in claim 1, in which the Sn content of said copper-lead-based alloy layer is 0.5 to 5% by weight.

5. A corrosion-resistant copper-lead alloy multilayer bearing comprising a back metal, a copper-lead-based bearing alloy layer bonded thereto, and an overlay, said copper-lead-based bearing alloy consisting by weight of 10.5 to 18% Ni, 0.5 to 8% Sn, 10 to 26% Pb, 0.005 to incidental impurities, said bearing having high corrosion resistance to both lubricant with a high sulfur content and corrosive degraded lubricant.

6. A copper-lead alloy bearing as set forth in claim 5, in which said back metal is a steel, or a steel having a plating layer of copper or a copper alloy of a thickness of 10 microns or less on the side of said copper-lead-based bearing alloy layer.

7. A copper-lead alloy bearing as set forth in claim 5, in which said overlay formed on said copper-lead-based bearing alloy layer consists of: at least one selected from the group consisting of 3 to 18% Sn, not more than 15% In, not more than 5% Cu; and the balance Pb and incidental impurities.

8. A copper-lead alloy bearing as set forth in claim 5, wherein the Ni content of said copper-lead-based alloy layer is 10.5 to 15%.

9. A copper-lead alloy bearing as set forth in claim 5, in which the Sn content of said copper-lead-based alloy layer is 0.5 to 5% by weight.

* * * * *

UNITED STATES PATENT AND TRADEMARK OFFICE
CERTIFICATE OF CORRECTION

PATENT NO. : 5,665,480
DATED : Sep. 9, 1997
INVENTOR(S) : Tadashi Tanaka et al.

It is certified that error appears in the above-identified patent and that said Letters Patent is hereby corrected as shown below:

Column 6, line 3, patent claim 5, after "0.005 to" insert --0.1% P, and the balance of Cu and--.

Signed and Sealed this

Twenty-fourth Day of February, 1998

Attest:

BRUCE LEHMAN

Attesting Officer

Commissioner of Patents and Trademarks